United States Patent
Yamada

(10) Patent No.: US 9,792,484 B2
(45) Date of Patent: Oct. 17, 2017

(54) BIOMETRIC INFORMATION REGISTRATION APPARATUS AND BIOMETRIC INFORMATION REGISTRATION METHOD

(71) Applicant: FUJITSU LIMITED, Kawasaki-shi, Kanagawa (JP)

(72) Inventor: Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/010,946

(22) Filed: Jan. 29, 2016

(65) Prior Publication Data

US 2016/0239704 A1    Aug. 18, 2016

(30) Foreign Application Priority Data

Feb. 16, 2015   (JP) ................. 2015-028023

(51) Int. Cl.
  *G06K 9/62*   (2006.01)
  *G06K 9/00*   (2006.01)

(52) U.S. Cl.
  CPC ......... *G06K 9/00093* (2013.01); *G06K 9/001* (2013.01); *G06K 9/0008* (2013.01); *G06K 9/00073* (2013.01); *G06K 9/00087* (2013.01); *G06K 9/00892* (2013.01); *G06K 9/00926* (2013.01)

(58) Field of Classification Search
  CPC .................... G06K 9/00006–9/0012
  See application file for complete search history.

(56) References Cited

U.S. PATENT DOCUMENTS

| 5,815,252 A * | 9/1998 | Price-Francis ..... G07C 9/00087 |
| | | 235/492 |
| 9,418,274 B2 * | 8/2016 | Aoki .................. G06K 9/00033 |
| 2004/0165754 A1 | 8/2004 | Tabata |

FOREIGN PATENT DOCUMENTS

| EP | 1612718 A2 | 1/2006 |
| EP | 2677495 A1 | 12/2013 |
| JP | 04-052974 | 2/1992 |
| JP | 2004-054788 | 2/2004 |
| JP | 2004-234355 | 8/2004 |
| JP | 2006-309562 | 11/2006 |
| JP | 2010-257007 | 11/2010 |
| JP | 2010-257007 A | 11/2010 |

(Continued)

OTHER PUBLICATIONS

Elham Tabassi et al., "Fingerprint Image Quality", NISTIR 7151, pp. 1-72, Aug. 2004 (72 pages).

(Continued)

*Primary Examiner* — Brian P Werner
(74) *Attorney, Agent, or Firm* — Fujitsu Patent Center

(57) ABSTRACT

A sensor acquires the same type of biometric information from plural fingers in association with an ID. A processor generates feature data used for verification from the biometric information, and generates characteristic data used for calculation of similarity between the plural fingers from the biometric information. Next, the processor compares the characteristic data and calculates the similarity between the plural fingers. The processor determines whether the feature data is registrable based on the similarity, and a memory stores the feature data in association with the ID when the feature data is registrable.

9 Claims, 8 Drawing Sheets

(56) References Cited

FOREIGN PATENT DOCUMENTS

JP     WO 2014112081 A1 *   7/2014   ......... G06K 9/00033
WO           00/35135 A1     6/2000

OTHER PUBLICATIONS

Extended European Search Report dated May 12, 2016 for corresponding European Patent Application No. 16152926.8, 7 pages.
Cummins, Harold et al., "The Breadths of Epidermal Ridges on The Finger Tips and Palms: A Study of Variation", American Journal of Anatomy, vol. 68, No. 1, Jan. 1, 1941, pp. 127-150, XP055266077.

\* cited by examiner

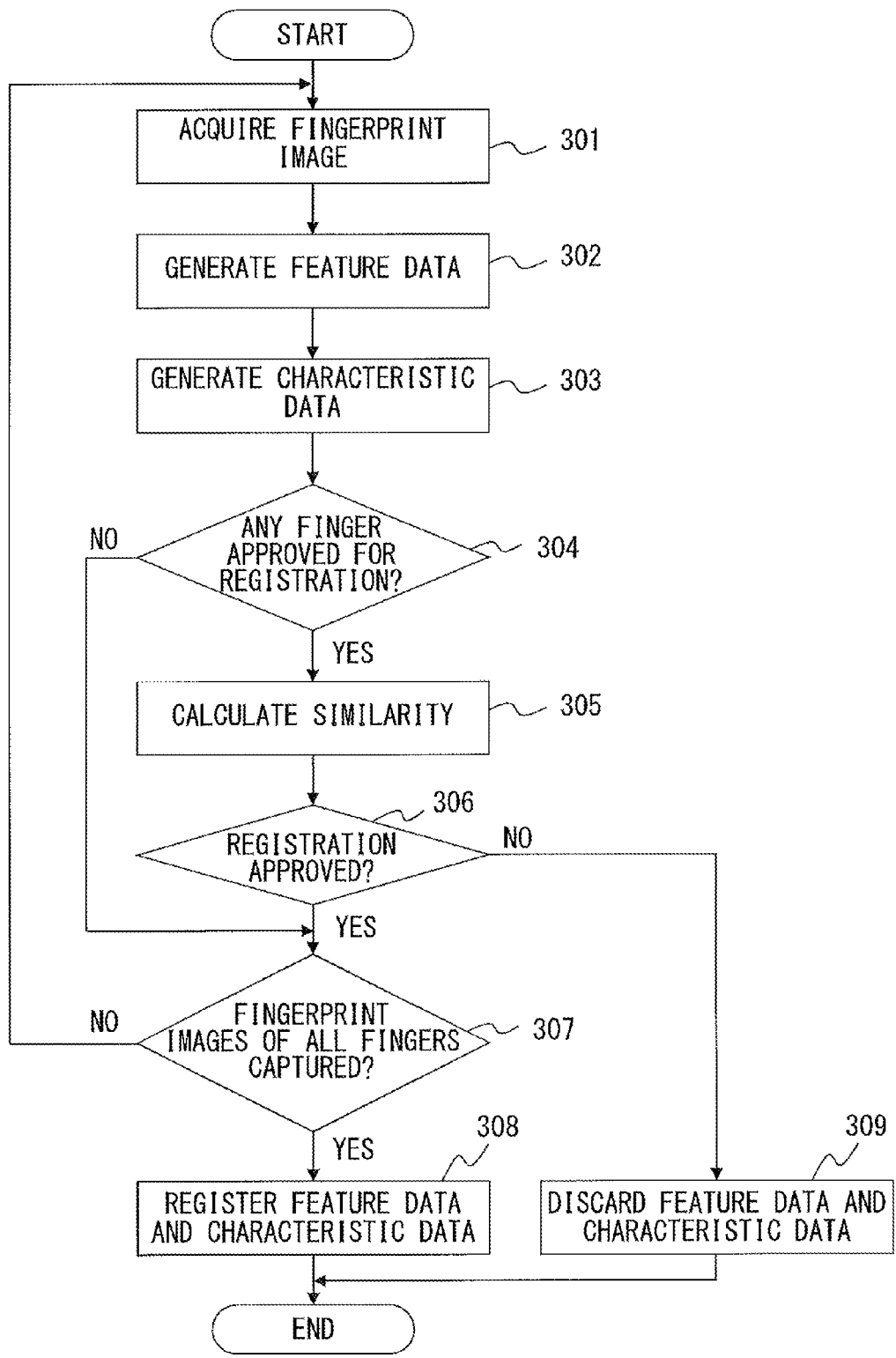
F I G. 3

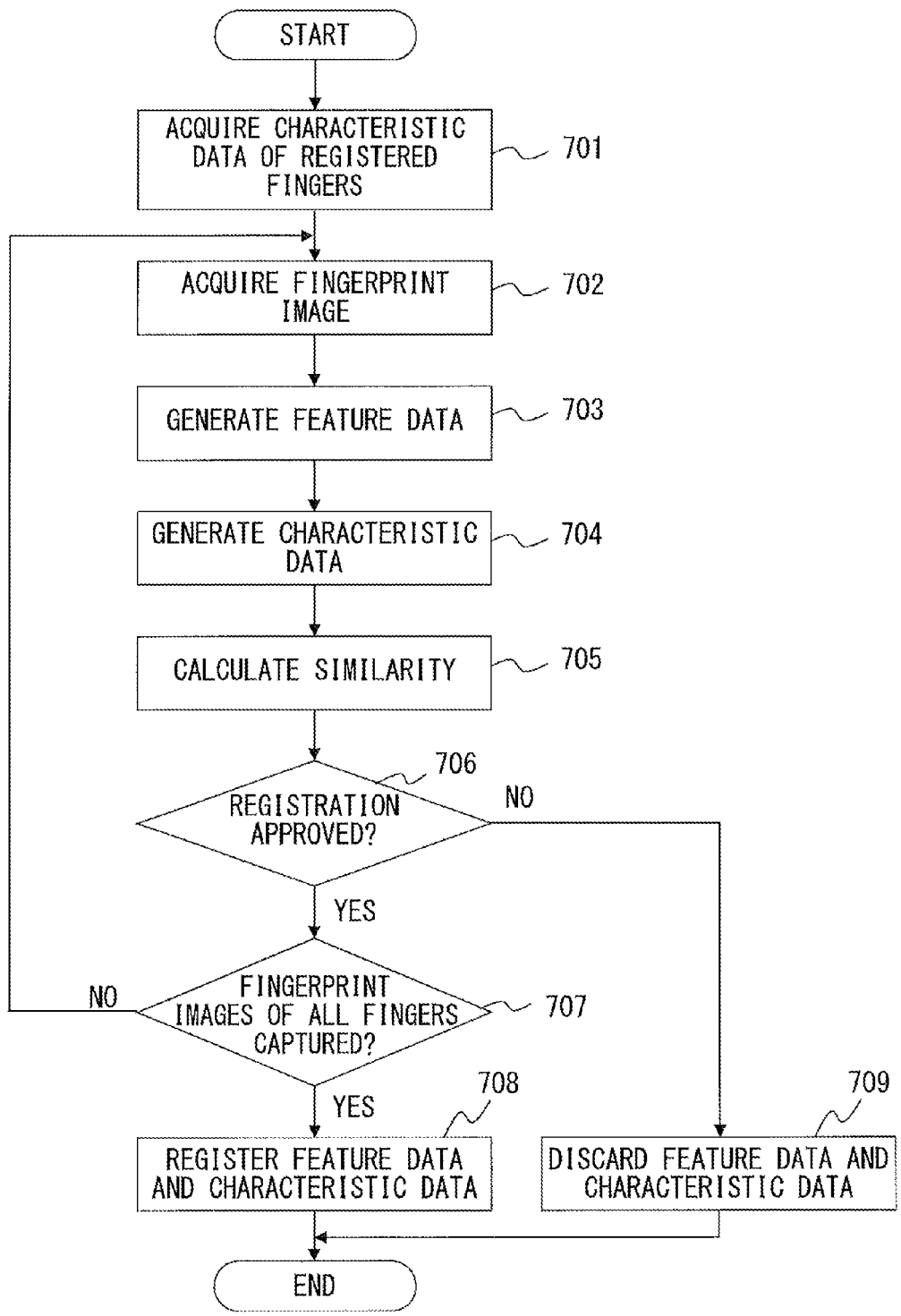
F I G. 7

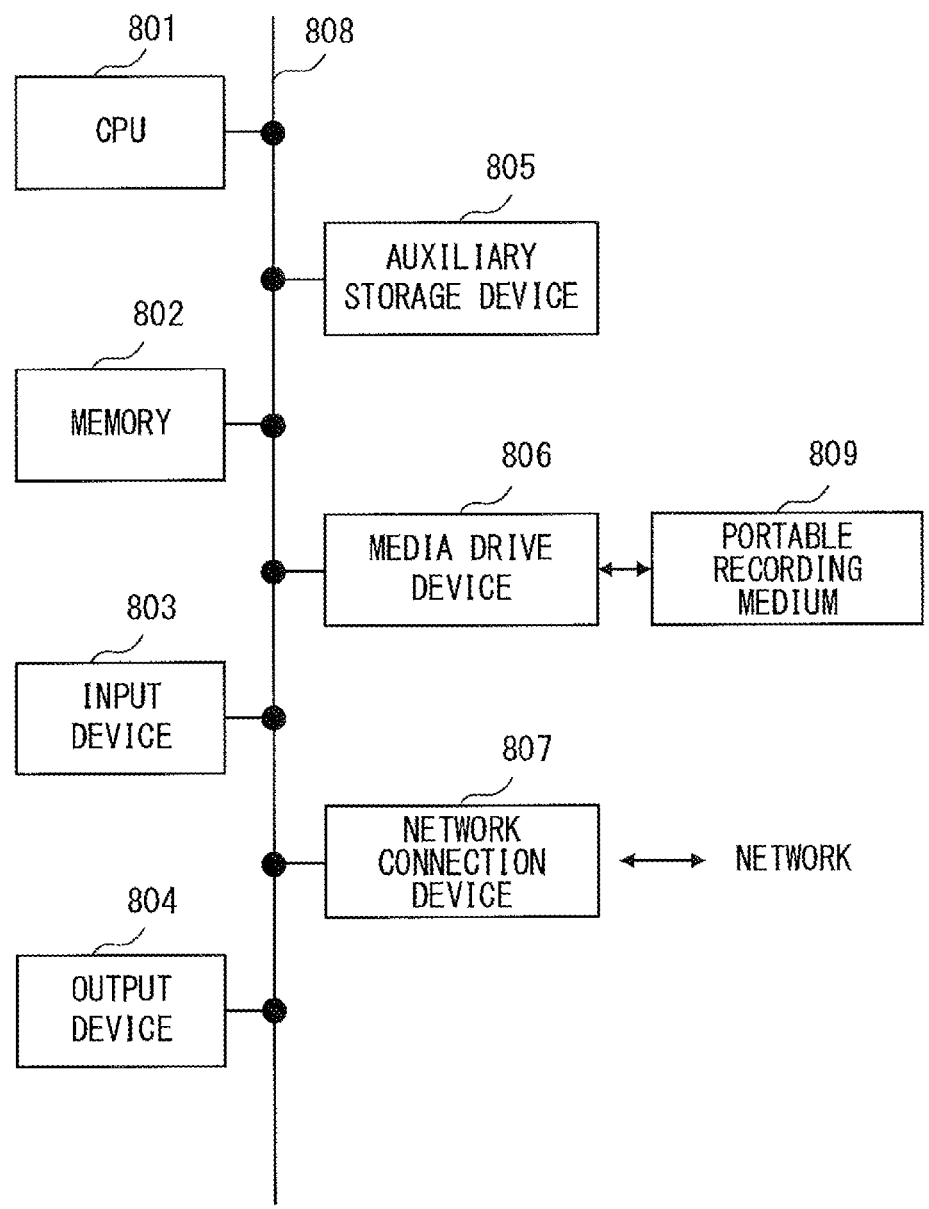
F I G. 8

BIOMETRIC INFORMATION REGISTRATION APPARATUS AND BIOMETRIC INFORMATION REGISTRATION METHOD

CROSS-REFERENCE TO RELATED APPLICATION

This application is based upon and claims the benefit of priority of the prior Japanese Patent Application No. 2015-028023, filed on Feb. 16, 2015, the entire contents of which are incorporated herein by reference.

FIELD

The embodiments discussed herein relates to a biometric information registration apparatus and a biometric information registration method.

BACKGROUND

In the personal authentication using biometric authentication, it is important that biometric information of a registrant is correctly registered at the time of registration. Even if rigorous identification is performed through biometric authentication at the time of personal authentication, in the case that biometric information of another person is fraudulently registered at the time of registration, the person could impersonate the registrant.

There are various possible cases in fraudulent registration of biometric information conducted by another person such as a case in which all of registered biometric information is biometric information of another person, and a case in which a portion of registered biometric information is that of another person. The latter case is such that in an attendance management system as an example, biometric information of the right hand of a person A is registered as the registered biometric information for right hand and biometric information of the left hand of another person B is registered as the registered biometric information of left hand with the cooperation of the person A. In this case, the person B can record the clock in time on behalf of the person A even when the person A is absent.

Against such fraudulent registration, in situations in which a biometric authentication system is used in companies, it is often a case that with the participation of employees, identification of the employees is conducted in front of an operator such as a manager, and then registration of biometric information is performed. By performing registration while the operator sees the employees in person, it is possible to prevent fraudulent registration such that biometric information of plural persons are registered in association with one ID (identification information).

However, as biometric authentication systems installed in mobile terminals such as a laptop personal computer and a smartphone grow popular, an opportunity that the employees register biometric information without an operator has been increasing. For that reason, it is desirable to take measures to prevent fraudulent registration without an operator.

Regarding the fraudulent registration prevention, a biometric information registration apparatus that can prevent fraudulent registration of biometric information of a person other than a person who should be registered (see Patent Document 1 as an example). This biometric information registration apparatus acquires related information related to a biological part registered as biometric information, and based on the related information, the apparatus determines whether or not the acquisition of the biometric information is correctly conducted.

In addition, a dishonest registration preventive apparatus for automatically and surely determining intermixture of another person's image without resorting to human labor and beforehand preventing dishonest registration due to substitution has been known (see Patent Document 2 as an example). This dishonest registration preventive apparatus detects positions of a face of a person from plural images acquired by consecutively photographing the face with a camera and calculates a variation between a position at this time and a position at the last time for the detected face positions. The dishonest registration preventive apparatus determines the image at this time to be a registrable image when the variation does not amount to the threshold, and determines the image at this time to be an unregistrable image when the variation exceeds the threshold.

An entry/exit management apparatus capable of reliably preventing spoofing has also been known (see Patent Document 3 as an example). This entry/exit management apparatus requests reading of new registration palm feature data of both hands upon new registration, stops registration when it determines that the new registration palm feature data of one hand is identical with new registration palm feature data of another hand. In addition, when the entry/exit management apparatus determines that the new registration palm feature data of the one hand is not identical with the new registration palm feature data of the another hand, it verifies the new registration palm feature data of the one hand and of the another hand against registered palm feature data registered in the biological database. When the identical data of either of the both hands is not found in the biological database, the entry/exit management apparatus registers the new registration palm feature data together with personal authentication information.

A human body recognition device capable of correctly performing registration/collation/updating even when a human body is replaced in the middle of performing the registration/collation/updating and preventing malfunctions by the erroneous recognition of the human body has also been known (see Patent Document 4 as an example). This human body recognition device changes the information to be utilized for recognition and output contents, in the case of detecting the replacement of the human body to be an object while performing the registration processing or updating processing or collation processing of the biological body feature information.

A fingerprint pattern sorting device to automatically sort a fingerprint pattern has also been known (see Patent Document 5 as an example). An algorithm to measure a quality of fingerprint images has also been known (see Non-Patent Document 1 as an example).

Patent Document 1: Japanese Laid-Open Patent Publication No. 2006-309562
Patent Document 2: Japanese Laid-Open Patent Publication No. 2004-54788
Patent Document 3: Japanese Laid-Open Patent Publication No. 2010-257007
Patent Document 4: Japanese Laid-Open Patent Publication No. 2004-234355
Patent Document 5: Japanese Laid-Open Patent Publication No. 4-52974
Non-Patent Document 1: Tabassi et al., "Fingerprint Image Quality", NISTIR 7151, August 2004.

SUMMARY

According to an aspect of the embodiments, a biometric information registration apparatus includes a biometric information sensor, a processor, and a memory.

The biometric information sensor acquires the same type of biometric information from plural fingers in association with one ID. The processor generates feature data used for verification from the biometric information, and generates characteristic data used for calculation of similarity between the plural fingers from the biometric information. Next, the processor compares the characteristic data and calculates the similarity between the plural fingers. The processor determines whether the feature data is registrable based on the similarity, and a memory stores the feature data in association with the ID when the feature data is registrable.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart of the biometric information registration processing by using fingerprint information;

FIG. 7 is a flowchart of biometric information registration processing performed at the time of additional registration or reregistration; and FIG. 8 is a diagram illustrating a configuration of an information processing apparatus.

DESCRIPTION OF EMBODIMENTS

Details of the embodiments are explained below with reference to the drawings.

In the biometric information registering device in Patent Document 1, a space to implement a task of registering biometric information is limited by the use of a camera to obtain related information. For that reason, this biometric information registering device is considered to be unsuitable for mobile terminals.

The dishonest registration preventive apparatus in Patent Document 2 detects a position of a face from plural images acquired by consecutively photographing the face with a camera, and such an apparatus is considered to be unsuitable for a registration task that registers biometric information of different biological parts such as a left hand and a right hand. Particularly, in a case of fingerprint authentication, the use of a contact-type sensor is predominant in biometric information acquisition, and a finger is lifted off the contact-type sensor when switching fingers. Thus, it is difficult to implement this dishonest registration preventive apparatus.

The entry/exit management apparatus in Patent Document 3 performs verification by comparing palm feature data of both hands to be registered. However, this verification only verifies whether or not the palm feature data of the two hands is identical, but does not verify whether the palm feature data is of multiple persons. In addition, the apparatus implements a registration double check by comparing with the registered palm feature data. However, if palm feature data for multiple persons has not been registered, fraudulent registration is possible.

As described above, in the existing fraudulent registration prevention technology, it is difficult, without an operator, to effectively prevent fraudulent registration that registers feature data of multiple persons under a single ID in a biometric authentication system installed in a mobile terminal etc.

It is noted that such problems occur not only in a case of registering fingerprint information but also in a case of registering other biometric information such as finger vein images.

Figure 1:
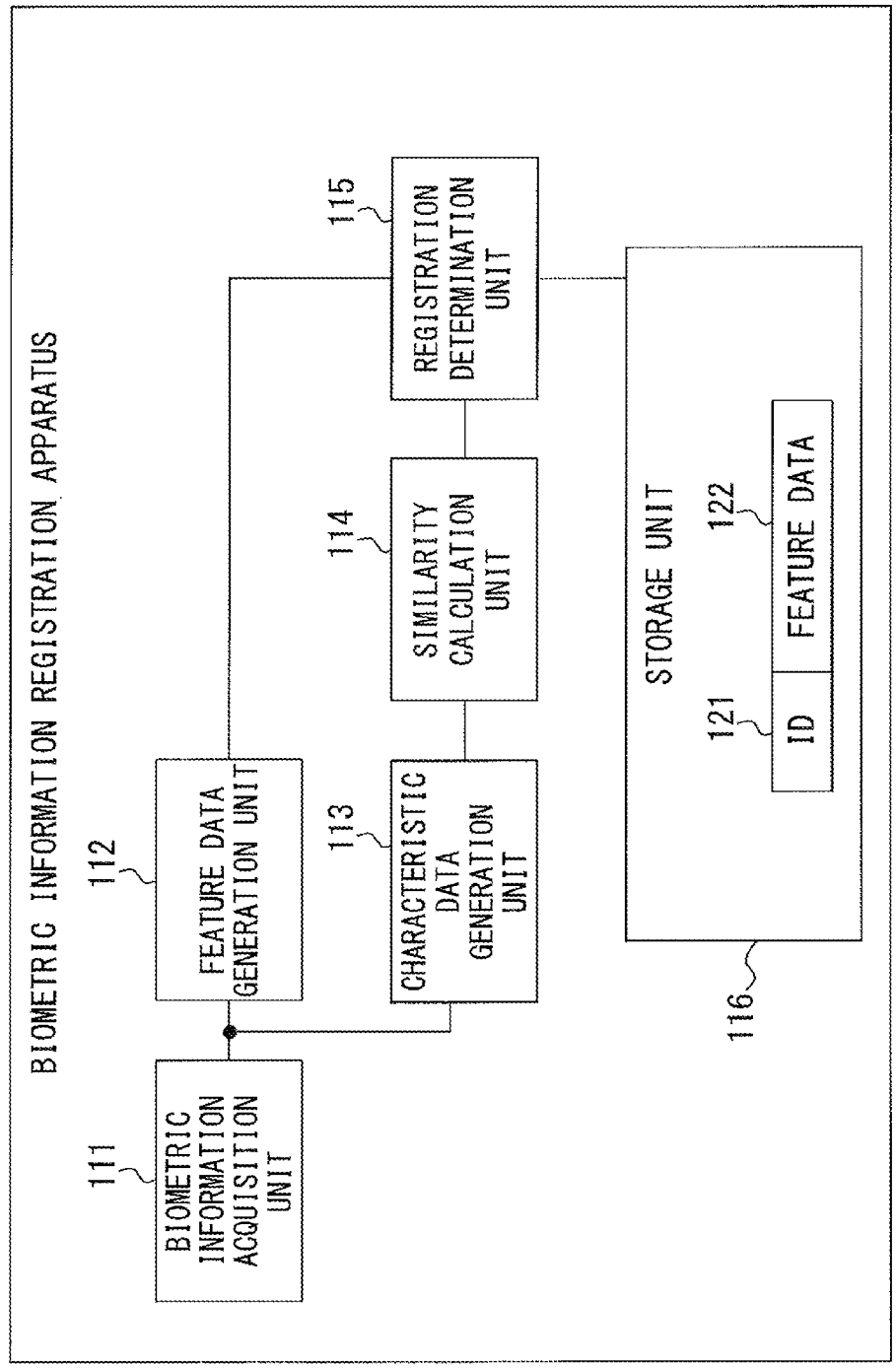
FIG. 1 is a diagram illustrating a functional configuration of a biometric information registration apparatus.

FIG. 1 illustrates an example of a functional configuration of a biometric information registration apparatus. A biometric information registration apparatus 101 in FIG. 1 includes a biometric information acquisition unit 111, a feature data generation unit 112, a characteristic data generation unit 113, a similarity calculation unit 114, a registration determination unit 115, and a storage unit 116.

Figure 2:
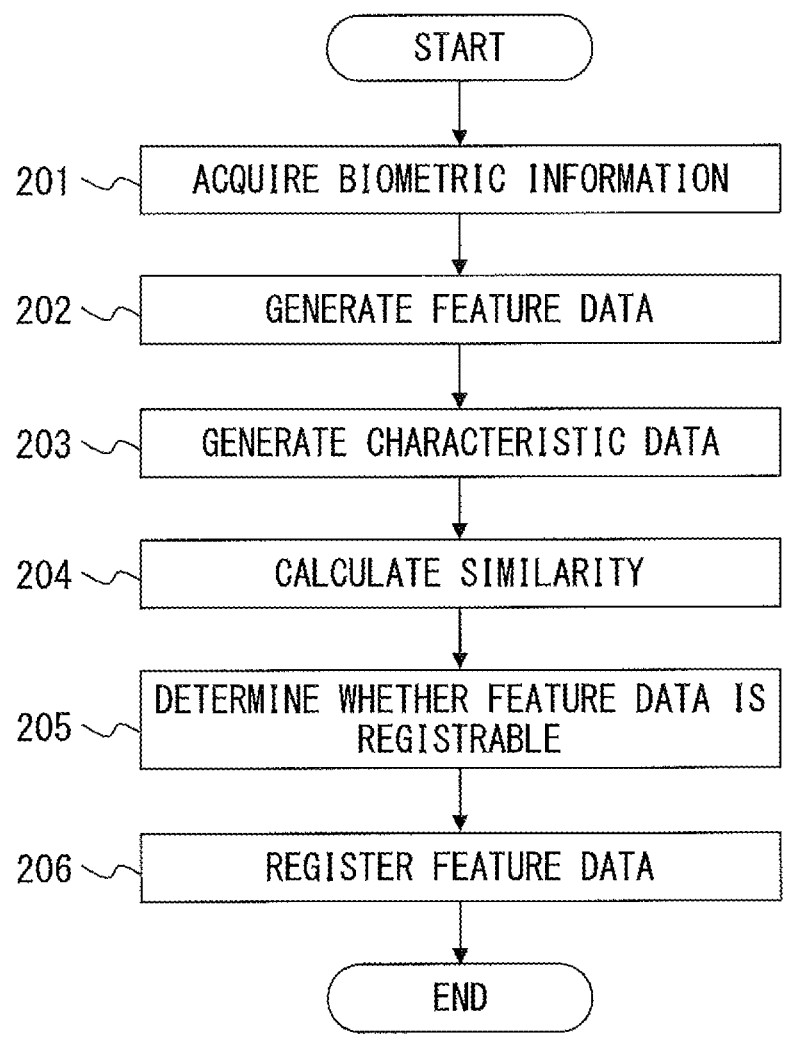
FIG. 2 is a flowchart of biometric information registration processing.

FIG. 2 is a flowchart illustrating an example of biometric information registration processing that is performed by the biometric information registration apparatus 101 in FIG. 1. First of all, the biometric information acquisition unit 111 acquires the same type of biometric information from plural fingers in association with an ID 121 (step 201). Next, the feature data generation unit 112 generates feature data 122 to be used for verification from the biometric information (step 202), and the characteristic data generation unit 113 generates characteristic data to be used for calculation of similarity between the plural fingers from the biometric information (step 203).

Next, the similarity calculation unit 114 compares the characteristic data and calculates the similarity between the plural fingers (step 204). The registration determination unit 115 determines whether or not the feature data 122 is registrable based on the similarity (step 205), and registers the feature data 122 in the storage unit 116 in association with the ID 121 when the feature data 122 is registrable (step 206).

According to this biometric information registration apparatus 101, fraudulent registration of biometric information can be prevented with a simple method.

Next, biometric information registration processing when fingerprint information is used as biometric information of fingers is explained. The biometric information acquisition unit 111 that acquires fingerprint information is realized by a fingerprint sensor such as a capacitive fingerprint sensor, a thermal fingerprint sensor, an electric field fingerprint sensor, an optical fingerprint sensor, and an ultrasonic fingerprint sensor, captures fingerprint images from the fingers presented by a registrant, and converts the captured fingerprint images into digital images. It is possible to capture the fingerprint images sequentially one finger after another by a single fingerprint sensor, or it is also possible to capture a fingerprint image of plural fingers at once by a fingerprint sensor that has a wide capture area and can capture plural fingerprints at the same time. The fingerprint sensor may be connected to the biometric information registration apparatus 101 via an interface or may be built into the biometric information registration apparatus 101.

FIG. 3 is a flowchart illustrating an example of biometric information registration processing by using fingerprint information. In this biometric information registration processing, a prescribed number of fingers of one hand or both hands of a registrant are a registration target, and the fingerprint information of these fingers will be registered in the storage unit 116. The registration target may be all fingers of both hands of the registrant.

First, the biometric information acquisition unit 111 captures a fingerprint image from one finger of a hand of the registrant (step 301). Next, from the fingerprint image, the feature data generation unit 112 generates feature data 122 (step 302) that is used for verification at the time of biometric authentication. For the feature data 122, a position of a feature point included in the fingerprint image can be used as an example, and as the feature point, for example, minutia such as an ending point at which a ridge terminates or a bifurcation point at which a ridge splits into two can be used.

Next, the characteristic data generation unit 113 generates characteristic data that is used to calculate similarity between plural fingers from fingerprint images (step 303). For the characteristic data, it is desirable that data that is similar between different fingers of one person be used. The feature data 122 such as minutia is not suitable for the characteristic data because the feature data 122 is not similar between different fingers of a person.

For the characteristic data that is similar between different fingers of a person, as an example, a characteristic value such as the size (width or area etc.) of an area that includes a fingerprint (fingerprint area) in a fingerprint image, the fingerprint pattern, the quality of the fingerprint image, the width of ridges, and the distance between ridges can be used. The characteristic data generation unit 113 can generate the characteristic data by combining plural types of characteristic values.

The characteristic data generation unit 113 can obtain the width of a fingerprint area by detecting the leftmost black pixel and the rightmost black pixel of black pixels that indicate ridges in a fingerprint image and by calculating the distance between these two black pixels.

For the fingerprint pattern, as disclosed in Patent Document 5 as an example, plural types of patterns have been known, and the fingerprint patterns of a fingerprint image can be represented by using values indicating the likelihood corresponding to each of the patterns. When three types of patterns including the whorl, loop, and arch are used as an example, the values representing these fingerprint patterns are vector values such as (P1, P2, P3). Each of P1, P2, and P3 represents the likelihood of being whorl, the likelihood of being loop, and the likelihood of being arch, respectively.

The characteristic data generation unit 113 can calculate the quality of a fingerprint image based on the contrast etc. of the fingerprint image by using an algorithm disclosed in Non-Patent Document 1 as an example.

Figure 4:
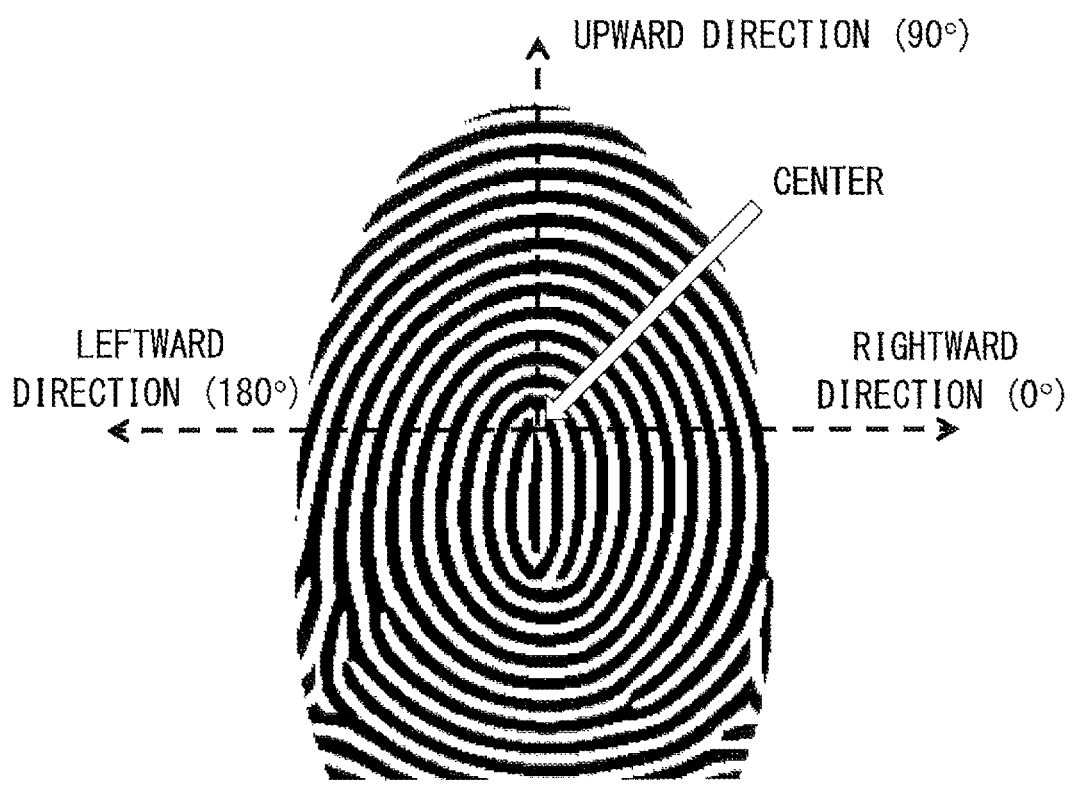
FIG. 4 is a diagram illustrating a method of calculating the width of a ridge.

FIG. 4 illustrates an example of a method of calculating the width of a ridge. The characteristic data generation unit 113 detects the center of a whorl in a fingerprint from a fingerprint image, sets the detected position to be a starting point, and searches for a black pixel in each of the leftward direction (180°), the upward direction (90°), and the rightward direction (0°) until the end of the image.

The characteristic data generation unit 113, then, detects the number of consecutive black pixels from each of plural black pixel concatenated areas, and calculates a statistical value of the detected number of black pixels as the width of the ridge. For the statistical value of the number of black pixels, the average value, the median value, the maximum value, and the minimum value can be used as an example.

Figure 5:
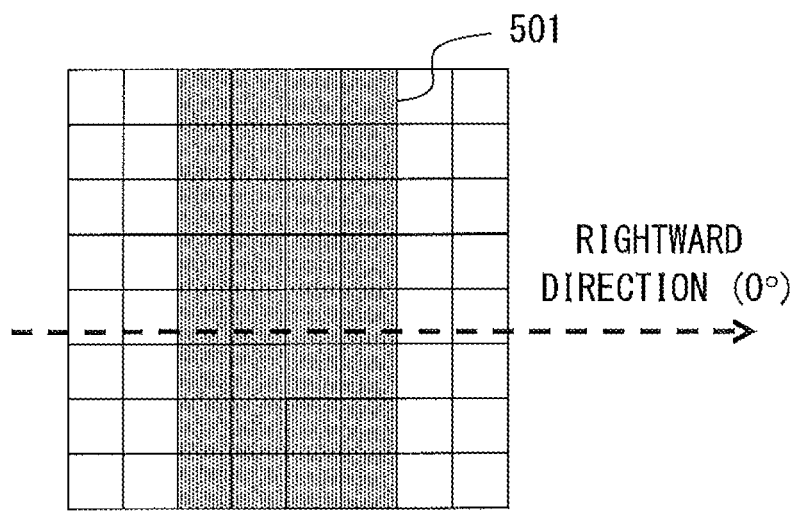
FIG. 5 is a diagram illustrating a black pixel concatenated area.

For example, in a case of a black pixel concatenated area 501 in FIG. 5, because there are four consecutive black pixels in the rightward direction, the number of black pixels in the rightward direction is four.

The characteristic data generation unit 113 can obtain a distance between ridges based on the search result from the center of the whorl to the end of the image. For example, the characteristic data generation unit 113 obtains the distance between ridges by taking a black pixel concatenated area including consecutive black pixels as a single ridge, detecting the number of ridges existing between the center and the end of the image, and dividing the number of pixels (searched distance) in a searched direction by the number of ridges.

Next, the similarity calculation unit 114 checks whether or not registration of a fingerprint image of any finger has been approved (step 304). When the fingerprint image captured in step 301 is a fingerprint image of the first finger of the registration target, there has not yet been a finger approved for registration of its fingerprint image (step 304, No). In this case, the registration determination unit 115 approves the registration of the fingerprint image of the first finger and checks whether or not fingerprint images of all the fingers of the registration target have been captured (step 307). When a fingerprint image of any of the fingers has not been captured (step 307, No), the biometric information registration apparatus 101 repeats the processing in step 301 and subsequent steps for another finger.

Meanwhile, when the fingerprint image captured in step 301 is a fingerprint image of the second finger or a subsequent finger of the registration target, there is a finger approved for registration of its fingerprint image (step 304, Yes). In this case, the similarity calculation unit 114 calculates an index of similarity between the characteristic data of the fingerprint image of the finger that is approved for registration and the characteristic data generated in step 303 (step 305).

For the index of similarity, the degree of similarity that indicates that the two pieces of characteristic data are more similar as the value becomes greater, or the degree of difference that indicates that the two pieces of characteristic data are more similar as the value becomes smaller can be used.

Here, the characteristic data of the fingerprint image of a finger approved for registration is represented by an n-dimensional vector X having n characteristic values $x_i$ ($i=1$~$n$) as elements, and the characteristic data generated in step 303 is represented by an n-dimensional vector Y having n characteristic values $y_i$ ($i=1$~$n$).

$$X=(x1, x2, \ldots, xn) \qquad (1)$$

$$Y=(y1, y2, \ldots, yn) \qquad (2)$$

At that time, a similarity S between vector X and vector Y can be calculated from the following equation as an example.

$$S=\#\{|xi-yi|<THi\}, i=1, \ldots, n \qquad (3)$$

$TH_i$ on the right-hand side of the equation (3) represents a threshold for the i-th characteristic value, and $\#\{|xi-yi|<THi\}$ represents the number of characteristic values that satisfy a condition such that the absolute value of the difference between $x_i$ and $y_i$ is less than $TH_i$. Consequently, the similarity S is an integer not less than 0 and not more than n. Cosine similarity between vector X and vector Y can also be used as the similarity S.

In addition, for the degree of difference D between vector X and vector Y, distance values such as L1-norm D1, L2-norm D2 can be used.

$$D1 = \Sigma |xi - yi| \quad (4)$$

$$D2 = \Sigma (xi - yi)^2 \quad (5)$$

Σ on the right-hand side of the equation (4) and the equation (5) represents the sum for i=1~n.

Next, the registration determination unit 115 determines whether or not the feature data 122 generated in step 302 can be registered in accordance with the calculated similarity (step 306). When the similarity to the characteristic data of all the fingers that have been approved for registration satisfies the determination condition, the registration determination unit 115 approves registration of the feature data 122. On the other hand, when the similarity to the characteristic data of any of the fingers that have been approved for registration does not satisfy the determination condition, the registration determination unit 115 does not approve the registration of the feature data 122.

When the degree of similarity is used as an index of similarity, the registration determination unit 115 can use a determination condition wherein the degree of similarity is greater than a prescribed threshold. In this case, the registration determination unit 115 compares the degree of similarity with the threshold. When the degree of similarity is greater than the threshold, the determination condition is satisfied, and when the degree of similarity is equal to or less than the threshold, the determination condition is not satisfied.

Moreover, when the degree of difference is used as an index of similarity, the registration determination unit 115 can use a determination condition wherein the degree of difference is smaller than a prescribed threshold. In this case, the registration determination unit 115 compares the degree of difference with the threshold. When the degree of difference is smaller than the threshold, the determination condition is satisfied, and when the degree of difference is equal to or greater than the threshold, the determination condition is not satisfied.

In this manner, as the vector X and the vector Y become more similar to each other, the determination condition is more likely to be satisfied, and the feature data 122 is more likely to be approved for registration. On the other hand, as the vector X and the vector Y become more different, the determination condition is less likely to be satisfied, and the feature data 122 is less likely to be approved for registration.

When registration is approved (step 306, Yes), the registration determination unit 115 checks whether or not fingerprint images of all fingers of the registration target have been captured (step 307). When no fingerprint image has been captured for any finger (step 307, No), the biometric information registration apparatus 101 repeats the processing in step 301 and subsequent steps for another finger.

When the fingerprint images of all fingers of the registration target have been captured (step 307, Yes), the registration determination unit 115 registers the feature data 122 and the characteristic data of the fingers in the storage unit 116 in association with the ID 121 (step 308). As a result, fingerprint images of all fingers of a registration target are determined to be the fingerprint images of one person and are registered in association with the ID 121.

On the other hand, when registration is not approved (step 306, No), the registration determination unit 115 discards the feature data 112 and the characteristic data of all fingers that have been generated so far (step 309). As a result, a fingerprint image of at least one finger of a registration target is determined to be the fingerprint image of another person, and registration of fingerprint images of all fingers is rejected.

Figure 6:
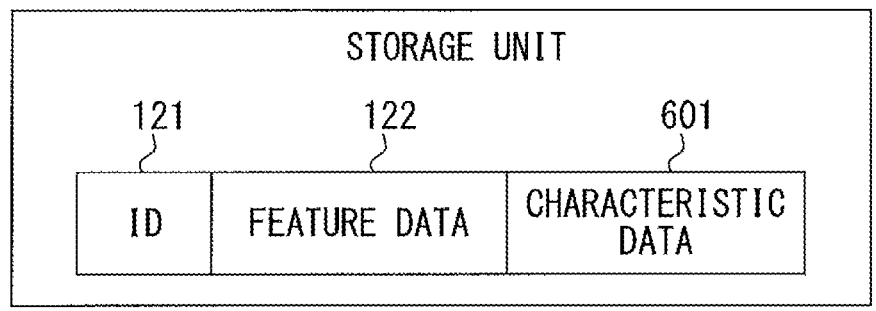
FIG. 6 is a diagram illustrating registered feature data and characteristic data.

FIG. 6 illustrates an example of the feature data and the characteristic data registered in the storage unit 116. The storage unit 116 stores the feature data 122 and the characteristic data 601 in association with the ID 121. For each of the fingers of the registration target, the feature data 122 and the characteristic data 601 are registered in association with the ID 121.

The biometric information registration apparatus 101 performs biometric authentication processing by using the feature data 122 registered in the storage unit 116. In the biometric authentication processing, the biometric information acquisition unit 111 acquires a fingerprint image from at least one finger of a hand of a person being authenticated, the feature data generation unit 112 generates feature data from the fingerprint image for each of the fingers. Afterwards, the biometric information registration apparatus 101 verifies the generated feature data for each of the fingers by checking it against the feature data 122 for each of the fingers registered in the storage unit 116, and determines whether or not the person being authenticated is a registered person corresponding to the ID 121 based on the verification result.

According to the biometric information registration processing in FIG. 3, aside from feature data for verification, characteristic data for calculating similarity is generated from a fingerprint image of each finger, and similarity is calculated by comparing the generated characteristic data with characteristic data of each finger registered under a single ID. As a result of determining whether or not the feature data can be registered in accordance with the calculated similarity, it is possible to prevent fraudulent registration that registers feature data of multiple persons under a single ID. In addition, by using plural types of characteristic values that can be extracted from a fingerprint image as the characteristic data, it is possible to improve the accuracy of the determination result of whether or not the feature data can be registered.

In the meantime, additional registration or reregistration of fingerprint images is sometime performed after the feature data 122 and the characteristic data 601 of the fingers of the registration target are registered in the storage unit 116. The additional registration is processing to add the feature data and the characteristic data of a new finger that has not been included in the registration target, and the reregistration is processing to overwrite the feature data and the characteristic data of the registered fingers.

FIG. 7 illustrates an example of biometric information registration processing performed at the time of additional registration or reregistration. The fingers of the registration target in the additional registration or the reregistration can be one finger or plural fingers.

First, the similarity calculation unit 114 acquires the characteristic data 601 of all fingers registered in the storage unit 116 in association of the ID 121 (step 701). Next, the biometric information acquisition unit 111 acquires a fingerprint image from one finger of a registration target of additional registration or reregistration (step 702). Processing in the next steps 703 and 704 is the same as the processing in steps 302 and 303 in FIG. 3.

Next, the similarity calculation unit 114 calculates an index of similarity between the characteristic data 601 of each finger acquired from the storage unit 116 and the characteristic data generated in step 704 (step 705). The registration determination unit 115 determines whether or not the feature data generated in step 703 can be registered in accordance with the calculated similarity (step 706). When the similarity to the characteristic data 601 of all the fingers acquired from the storage unit 116 satisfies the determination condition that is similar to the condition in step 306, the registration determination unit 115 approves registration of the feature data. On the other hand, when the similarity to the characteristic data of any of the fingers acquired from the storage unit 116 does not satisfy the determination condition, the registration determination unit 115 does not approve the registration of the feature data.

When registration is approved (step 706, Yes), the registration determination unit 115 checks whether or not fingerprint images of all fingers of the registration target of additional registration or reregistration have been captured (step 707). When no fingerprint image has been captured for any finger (step 707, No), the biometric information registration apparatus 101 repeats the processing in step 702 and subsequent steps for another finger.

When the fingerprint images of all fingers of the registration target have been captured (step 707, Yes), the registration determination unit 115 registers the feature data and the characteristic data of the fingers in the storage unit 116 in association with the ID 121 (step 708). In the case of additional registration, the feature data and the characteristic data of a finger of the registration target is newly registered, and in the case of reregistration, the feature data 122 and the characteristic data 601 of the registered finger are overwritten. On the other hand, when registration is not approved (step 706, No), the registration determination unit 115 discards the feature data and the characteristic data of all fingers that have been generated so far (step 709).

According to the biometric information registration processing in FIG. 7, it is possible to prevent fraudulent registration that registers feature data of a different person under a registered ID at the time of additional registration or reregistration.

A time period from registration of the feature data 122 and the characteristic data 601 in the storage unit 116 through the biometric information registration processing in FIG. 3 to the additional registration or reregistration in FIG. 7 can be a short period of time of two or three days or it can be a long period of time of one month or longer.

For example, when additional registration or reregistration is performed after the changing of seasons, the characteristic value may vary in the same person due to the drying or moistening effect, and it is possible in such a case that registration is not approved. Considering this, it is effective to change the similarity calculation method based on the characteristic data in accordance with the changing of seasons. An example of the characteristic value that is subject to effects of the changing of seasons is the quality of fingerprint images.

In this case, the storage unit 116 stores a generation date on which the characteristic data 601 is generated in association with the characteristic date 601. The similarity calculation unit 114 changes the similarity calculation method based on the generation date stored in the storage unit 116 and the generation date of the characteristic date generated from fingerprint images at the time of additional registration or reregistration.

When the difference between the two generation dates is greater than a prescribed threshold, the similarity calculation unit 114 may exclude the quality of fingerprint images and calculate similarity, or may reduce the weight of the quality of fingerprint images and calculate similarity. A time period of a half year may be an example of the prescribed threshold.

In addition, when one of the two generation dates is winter (December to February), the similarity calculation unit 114 may exclude the quality of fingerprint images and calculate similarity, or may reduce the weight of the quality of fingerprint images and calculate similarity.

This alteration of the characteristic value used for calculation of similarity based on the generation date of the characteristic data decreases the likelihood of erroneously determining the same person to be a difference person due to the changing of seasons. Instead of the generation date of the characteristic date, generation date and time of the characteristic data can be also used.

The configuration of the biometric information registration apparatus 101 illustrated in FIG. 1 is only an example, and some of the elements in the configuration may be omitted or changed in accordance with the usage or conditions of the biometric information registration apparatus 101.

The flowcharts in FIG. 2, FIG. 3 and FIG. 7 are also mere examples, and a portion of the processing may be omitted or changed in accordance with the configuration or conditions of the biometric information registration apparatus 101. For example, the processing in step 202 and the processing in step 203 in FIG. 2 can be in reverse order. Similarly, the processing in step 302 and the processing in step 303 FIG. 3 can be in reverse order, and the processing in step 703 and the processing in step 704 in FIG. 7 can be in reverse order.

In the biometric information registration processing in FIG. 3 and FIG. 7, instead of capturing the fingerprint images one finger after another and determining whether or not feature data can be registered, a fingerprint image of plural fingers may be captured at once and whether or not feature data can be registered may be determined at once. In this case, the processing in step 307 in FIG. 3 and the processing in step 707 in FIG. 7 can be omitted.

Instep 306 in FIG. 3, the registration determination unit 115 may determine whether or not the feature data 122 can be registered in accordance with similarity to the characteristic data of any one finger of the fingers that are approved for registration. In this case, when similarity to the characteristic data of one finger satisfies the determination condition, the registration determination unit 115 approves registration of the feature data 122.

Instep 706 in FIG. 7, the registration determination unit 115 may determine whether or not the feature data can be registered in accordance with similarity to the characteristic data 601 of any one finger from among the characteristic data 601 of the fingers stored in the storage unit 116. In this case, when similarity to the characteristic data 601 of one finger satisfies the determination condition, the registration determination unit 115 approves registration of the feature data.

In the biometric information registration processing in FIG. 3 and FIG. 7, instead of the degree of similarity in equation (3), the degree of difference in equation (4), and the degree of difference in equation (5), other degrees of similarity or other degrees of difference can be used. Characteristic values other than the size of the fingerprint area in a fingerprint image, the fingerprint pattern, the quality of fingerprint images, the width of ridges, and the distance between ridges can be used as characteristic data. Instead of fingerprint images, other biometric information such as finger vein images can be used to generate feature data and characteristic data.

The biometric information registration apparatus 101 in FIG. 1 can be realized by using an information processing apparatus (computer) illustrated in FIG. 8 as an example.

The information processing apparatus in FIG. 8 has a Central Processing Unit (CPU) 801, a memory 802, an input device 803, an output device 804, an auxiliary storage device 805, a media drive device 806, and a network connection device 807. These elements are connected to each other via a bus 808. The biometric information acquisition unit 111 in FIG. 1 may be connected to the bus 808.

The memory 802 is, for example, a semiconductor memory such as a Read Only Memory (ROM), a Random Access Memory (RAM), and a flash memory, and stores a program and data used in the biometric information registration processing. The memory 802 can be used as the storage unit 116 in FIG. 1.

By executing the program with the use of the memory 802, for example, the CPU 801 (processor) operates as the feature data generation unit 112, the characteristic data generation unit 113, the similarity calculation unit 114, and the registration determination unit 115 in FIG. 1.

The input device 803 is a keyboard or a pointing device as an example, and is used for input of instructions and information from an operator or a user. The output device 804 is a display device, a printer, or a speaker as an example, and is used for output of inquiries or instructions and processing results to the operator or the user. The processing results include information indicating completion of registration of biometric information or rejection of registration.

Examples of the auxiliary storage device 805 are a magnetic disk device, an optical disk, a magnetic optical disk device, and a tape device. The auxiliary storage device 805 may be a hard disk drive. The information processing apparatus can store a program and data in the auxiliary storage device 805 and load them into the memory 802 to use them. The auxiliary storage device 805 can be used as the storage unit 116 in FIG. 1.

The media drive device 806 drives a portable recording medium 809 and accesses the recorded contents. The portable recording medium 809 are a memory device, a flexible disk, an optical disk, a magnetic optical disk and the like. The portable recording medium 809 may be a Compact Disk Read Only Memory (CD-ROM), a Digital Versatile Disk (DVD), a Universal Serial Bus (USB), etc. An operator can store a program and data in this portable recording medium 809 and load them into the memory 802 to use them.

As described above, a computer-readable recording medium that stores programs and data used in the biometric information registration processing is a physical (non-transitory) recording medium.

The network connection device 807 is a communication interface that is connected to a communication network such as a Local Area Network, and a Wide Area Network, and performs data conversion that is associated with communication. The information processing apparatus can receive a program and data from external apparatuses via the network connection device 807 and use the program and data by loading them into the memory 802.

The information processing apparatus can receive a processing request from a user terminal via the network connection device 807, perform the biometric information registration processing, and transmit a processing result to the user terminal.

It is noted that the information processing apparatus does not need to include all of the elements, but some of the elements can be omitted in accordance with the usage or conditions. For example, the input device 803 can be omitted when there is no instruction or information that need to be input from an operator or a user. The output device 804 can be omitted when there is no inquiry or information and a processing result that need to be output to the operator or the user.

Moreover, when there is no need to communicate with other apparatuses, the network connection device 807 can be omitted, or when the portable recording medium 809 is not used, the media drive device 806 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric information registration apparatus, comprising:
    a biometric information sensor configured to acquire a fingerprint image from a plurality of fingers in association with one ID;
    a processor configured to generate feature data used for verification from the fingerprint image, to generate characteristic data used for calculation of a similarity between the plurality of fingers from the fingerprint image, to calculate the similarity between the plurality of fingers by comparing the characteristic data, and to determine whether the feature data is registrable based on the similarity, the characteristic data indicating a size of a fingerprint of the fingerprint image, a likelihood of the fingerprint image being a type of fingerprint pattern, a quality of the fingerprint image, a width of a ridge of the fingerprint image, or a distance between ridges of the fingerprint image or any combination thereof; and
    a memory configured to store the feature data in association with the ID when the feature data is registrable.

2. The biometric information registration apparatus according to claim 1, wherein
    the memory further stores the characteristic data in association with the feature data;
    the biometric information sensor acquires additional biometric information from a finger that is identical with or different from the plurality of fingers after the memory stores the feature data and the characteristic data;
    the processor generates feature data from the additional biometric information, generates characteristic data from the additional biometric information, calculates similarity by comparing the characteristic data stored in the memory with the characteristic data generated from the additional biometric information, determines whether the feature data generated from the additional biometric information is registrable based on the similarity between the characteristic data stored in the memory and the characteristic data generated from the additional biometric information, and registers the feature data generated from the additional biometric information in the memory in association with the ID when the feature data generated from the additional biometric information is registrable.

3. The biometric information registration apparatus according to claim 2, wherein the memory further stores a generation date in association with the characteristic data, the generation date being a date on which the characteristic data used for calculation of the similarity between the plurality of fingers is generated, and the processor changes a calculation method of calculating the similarity based on the generation date stored in the memory and a generation date of the characteristic data generated from the additional biometric information.

4. The biometric information registration apparatus according to claim 1, wherein the processor determines that the feature data is registrable when the similarity is greater than a threshold.

5. A biometric information registration method, comprising:

acquiring a same type of biometric information from a plurality of fingers in association with one ID;

generating by a processor feature data used for verification from the biometric information;

generating by the processor characteristic data used for calculating a similarity between the plurality of fingers from the biometric information, the characteristic data indicating a size of a fingerprint of the fingerprint image, a likelihood of the fingerprint image being a type of fingerprint pattern, a quality of the fingerprint image, a width of a ridge of the fingerprint image, or a distance between ridges of the fingerprint image or any combination thereof;

calculating by the processor the similarity between the plurality of fingers by comparing the characteristic data; and determining by the processor whether the feature data is registrable based on the similarity and registering the feature data in a memory in association with the ID when the feature data is registrable.

6. The biometric information registration method according to claim 5, wherein the registering the feature data in the memory further registers the characteristic data in the memory in association with the feature data, the biometric information registration method further comprises:

acquiring additional biometric information from a finger that is identical with or different from the plurality of fingers after the memory stores the feature data and the characteristic data;

generating by the processor feature data from the additional biometric information;

generating by the processor characteristic data from the additional biometric information;

calculating by the processor similarity by comparing the characteristic data stored in the memory and the characteristic data generated from the additional biometric information; and determining by the processor whether the feature data generated from the additional biometric information is registrable based on the similarity between the characteristic data stored in the memory and the characteristic data generated from the additional biometric information, and registering the feature data generated from the additional biometric information in the memory in association with the ID when the feature data generated from the additional biometric information is registrable.

7. The biometric information registration method according to claim 6, wherein the registering the feature data in the memory further registers a generation date in association with the characteristic data, the generation date being a date on which the characteristic data used for calculation of the similarity between the plurality of fingers is generated, and the processor changes a calculation method of calculating the similarity based on the generation date stored in the memory and a generation date of the characteristic data generated from the additional biometric information.

8. The biometric information registration method according to claim 5, wherein the determining whether the feature data is registrable determines that the feature data is registrable when the similarity is greater than a threshold.

9. A non-transitory computer-readable recording medium having stored therein a biometric information registration program causing a computer to execute a process comprising:

acquiring a same type of biometric information from a plurality of fingers in association with one ID;

generating feature data used for verification from the biometric information;

generating characteristic data used for calculating a similarity between the plurality of fingers from the biometric information, the characteristic data indicating a size of a fingerprint of the fingerprint image, a likelihood of the fingerprint image being a type of fingerprint pattern, a quality of the fingerprint image, a width of a ridge of the fingerprint image, or a distance between ridges of the fingerprint image or any combination thereof;

calculating the similarity between the plurality of fingers by comparing the characteristic data; and determining whether the feature data is registrable based on the similarity and registering the feature data in a memory in association with the ID when the feature data is registrable.

* * * * *